United States Patent
Manchanda et al.

(10) Patent No.: US 9,894,602 B1
(45) Date of Patent: Feb. 13, 2018

(54) MANAGEMENT OF CELL SELECTION IN A COMMUNICATIONS SYSTEM

(71) Applicant: Sprint Spectrum L.P., Overland Park, KS (US)

(72) Inventors: Nitesh Manchanda, Overland Park, KS (US); Siddharth S. Oroskar, Overland Park, KS (US); Vanil Parihar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 40 days.

(21) Appl. No.: 15/083,783

(22) Filed: Mar. 29, 2016

(51) Int. Cl.
| | |
|---|---|
| *H04W 48/16* | (2009.01) |
| *H04W 64/00* | (2009.01) |
| *H04W 56/00* | (2009.01) |
| *H04W 76/02* | (2009.01) |
| *H04W 60/00* | (2009.01) |

(52) U.S. Cl.
CPC ......... *H04W 48/16* (2013.01); *H04W 56/001* (2013.01); *H04W 60/00* (2013.01); *H04W 64/003* (2013.01); *H04W 76/02* (2013.01)

(58) Field of Classification Search
CPC ... H04W 48/16; H04W 76/02; H04W 64/003; H04W 60/00; H04W 56/001; H04W 72/0453; H04W 48/02; H04W 36/28
See application file for complete search history.

(56) References Cited

U.S. PATENT DOCUMENTS

| | | | |
|---|---|---|---|
| 8,982,750 B2 | 3/2015 | Palanki et al. | |
| 9,479,989 B1 * | 10/2016 | Mehta | H04W 36/28 |
| 2010/0261472 A1 | 10/2010 | Han et al. | |
| 2011/0194501 A1 | 8/2011 | Chung et al. | |
| 2013/0003672 A1 | 1/2013 | Dinan | |
| 2015/0085841 A1 * | 3/2015 | Sadek | H04W 72/1215 |
| | | | 370/336 |
| 2015/0156773 A1 * | 6/2015 | Yao | H04L 5/001 |
| | | | 370/252 |
| 2017/0054470 A1 * | 2/2017 | Reza | H04B 1/44 |

OTHER PUBLICATIONS

Co-Pending U.S. Appl. No. 14/496,930, filed Sep. 25, 2014, "Controlling Handover Based on Carrier-Aggregation Policies".

\* cited by examiner

*Primary Examiner* — Andrew Lai
*Assistant Examiner* — Chuong M Nguyen

(57) ABSTRACT

According to aspects of the disclosure, a method and system are provided for managing cell selection in a wireless communication network. In accordance with this disclosure, each cell in a radio access network (RAN) broadcasts a respective carrier-aggregation policy of the cell on its air interface. A UE engaging in a cell selection process reads the respective carrier-aggregation policy of each cell under consideration and selects a cell on which to attach based at least in part on the respective carrier-aggregation policies of the cells. The UE can then attach to the selected cell so that the selected cell can then serve the UE.

20 Claims, 12 Drawing Sheets

MANAGEMENT OF CELL SELECTION IN A COMMUNICATIONS SYSTEM

BACKGROUND

Unless otherwise indicated herein, the description provided in this section is not itself prior art to the claims and is not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices (whether or not technically operated by a human user), can operate. In turn, each base station may be coupled with network infrastructure, including one or more gateways and switches, that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

In practice, physical base station equipment in such a system may be configured to provide multiple coverage areas, differentiated from each other by direction, carrier frequency, or the like. Each coverage area may provide service on one or more carriers, and each carrier in each coverage area may define a cell. For example, if a base station provides three coverage areas and provides service on two carriers per coverage area, the base station provides six cells. In some examples, there can be multiple cells at the same physical location, each provided by the same base station, and each being on a different carrier.

In general, a cellular wireless network may operate in accordance with a particular radio access technology or "air interface protocol," with communications from the base stations to UEs defining a downlink or forward link and communications from the UEs to the base stations defining an uplink or reverse link. Communications on a cell can be frequency division duplex (FDD), in which the downlink and uplink operate on separate frequency channels, or time division duplex (TDD), in which the downlink and uplink operate on a shared frequency channel and are distinguished from each other over time. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), and Global System for Mobile Communications (GSM), among others. Each protocol may define its own procedures for registration of UEs, initiation of communications, handover of UEs between cells, and functions related to air interface communication.

In accordance with the air interface protocol, air interface resources are mapped in the time domain and/or the frequency domain to provide discrete locations on the air interface for carrying communications. In a representative OFDMA network, for instance, the downlink of each cell is mapped over frequency and time into an array of resource elements, which define the locations on the air interface at which the base station can transmit data to UEs. In particular, the downlink is divided over frequency into a range of closely-spaced orthogonal subcarriers and is divided over time into a continuum of symbol time periods, thereby defining an array of resource elements each centered on a respective subcarrier and spanning a respective symbol time period. With this arrangement, as the base station has data to transmit to UEs, the base station may transmit the data in particular resource elements to the UE (i.e., at particular locations on the air interface).

By way of example, in accordance with the LTE protocol, the downlink of each cell spans a frequency bandwidth such as 1.4 MHz, 3 MHz, 5 MHz, 10 MHz, 15 MHz, or 20 MHz, and that frequency bandwidth is divided into 15 kHz subcarriers (i.e., subcarriers spaced apart from each other by 15 kHz). Further, the air interface is divided into a continuum of 10-millisecond (ms) frames, each frame is divided into ten 1 ms sub-frames, and each sub-frame is divided into two 0.5 ms slots. Each 1 ms downlink sub-frame is then further divided into 14 symbol time periods, each spanning 66.7 microseconds plus an added 4.69 microsecond guard band (cyclic prefix). With this arrangement, each sub-frame thus defines an array of resource elements, each centered on a 15 kHz subcarrier and spanning a symbol time period, and each such resource element may effectively carry a single orthogonal frequency division multiplexing (OFDM) symbol representing communication data.

In each frame, certain resource elements on the downlink are reserved for carrying particular types of data. For instance, resource elements at particular locations on the air interface are reserved for carrying synchronization signals, which enable UEs to synchronize their timing with that of the cell so that the UE can then read system information and evaluate the cell's coverage (e.g., a signal strength). Under LTE, for example, the base station provides primary and secondary synchronization signals on each cell. In particular, within a certain range of resource elements above and below the center frequency of the cell, the base station transmits a primary synchronization signal (PSS) in the last symbol period of the first slot (i.e., symbol period 6) within the first and sixth sub-frames (i.e., sub-frame 0 and sub-frame 5) of every frame. Further, the base station also transmits a secondary synchronization signal (SSS) in the second to last symbol period (i.e., symbol period 5) of those same slots and sub-frames, in the same range of range of resource elements above and below the center frequency of the cell. The PSS carries a coded value, and the SSS carries a coded value.

When a UE enters into coverage of a cell, the UE may engage in an initial access procedure to facilitate the UE communicating with the cell. In LTE, the UE first searches for the PSS of the cell (e.g., by looking for a PSS value that periodically recurs as expected) so as to lock onto the sub-frame timing of the cell. The UE will then read the SSS of the cell (e.g., by looking at the resource elements located one symbol period before the identified resource elements of the PSS) to lock onto the frame timing of the cell. Once the UE ascertains the PSS value and SSS value, the UE can then compute a physical cell identifier (PCI) of the cell (e.g., as a predefined function of those values). And given the PCI, the UE is then able to determine which resource elements on the air interface carry a reference signal, so that the UE can read and evaluate the strength of the reference signal. Based on the reference signal strength, the UE may select the cell and engage in a process of attaching to the cell so that a base station may then serve the UE on that cell. This procedure for synchronizing with and selecting a cell may also be generally referred to as a cell selection process.

The UE may use the above-described cell selection process in various scenarios. For example, when a UE powers on, a UE may use the cell selection process to select an initial cell on which the UE can attach and thereby gain access to the network. Additionally, for example, the UE may use the cell selection process after the UE has attached to an initial cell. For instance, when a UE is served by a particular cell, the UE may also regularly scan for other cells and evaluate the reference signal strength of those other cells in an effort to ensure that the UE operates in the best (e.g., strongest) coverage. Accordingly, when the UE detects other cells, the UE may engage in the above process so as to synchronize with each cell and evaluate each cell's respective reference signal strength. If the UE detects threshold weak reference signal strength from its serving cell and sufficiently strong reference signal strength from another cell, the UE may then engage in a handover process by which the UE transitions to be served by the other cell. In the idle mode, the UE may do this autonomously. Whereas, in the connected/active mode, the UE may report signal strengths to its serving cell when certain thresholds are met, and the cell may work to hand the UE over to another cell.

Under certain air interface protocols, a base station may be able to serve a UE concurrently on multiple cells (i.e., multiple carriers), to help increase the effective bandwidth and associated throughput available to the UE. This is known as carrier aggregation. By way of example, according to the LTE air interface protocol, the maximum bandwidth for a data transmission between a base station and a UE using a single carrier frequency is 20 MHz. By engaging in carrier aggregation, the base station may increase the number of resource elements provided to a UE by aggregating up to five carrier frequencies, and consequently increasing the maximum bandwidth to up to 100 MHz. To facilitate carrier aggregation service, the base station may designate one carrier as a primary carrier or primary cell (PCell) and the base station may designate each other carrier as a secondary carrier or secondary cell (SCell).

Depending on the desired implementation, a base station may be carrier aggregation capable or not. If a base station is carrier aggregation capable, the base station may have certain policies specifying which of its cells can be combined together to provide carrier aggregation. By way of example, a base station may have a carrier-aggregation policy for each cell that indicates whether the cell can be used as a PCell in combination with one or more other cell(s) as SCell(s). For instance, in one scenario, carrier-aggregation policies of a base station may indicate that a first cell and a second cell may be used as PCells, but a third cell may not be used as a PCell. Further, the carrier-aggregation policies may indicate that (i) the first cell can be a PCell with the second cell as an SCell, but not with the third cell as an SCell, whereas (ii) the second cell can be a PCell with both the first cell and the third cell as SCells. Thus, if the first cell is used as a PCell, the base station may aggregate two carriers, but if the second cell is used as a PCell, the base station may aggregate three carriers.

In practice, a base station may implement carrier-aggregation policies for a number of reasons. As one example, certain pairs of cells may be undesirable to combine because concurrent transmission on the carrier frequencies of the two cells could give rise to intermodulation distortion. For instance, concurrent transmission on two particular cells may combine to produce an undesirable radio frequency (RF) byproduct. If a base station engages in carrier aggregation with a UE on the two cells, the UE or base station may receive the RF byproduct, thus interfering with the transmissions on the two cells. As another example, a base station may implement carrier-aggregation policies that are dynamically modified over time based on the level of congestion in the control channel region of a particular cell. For instance, if all control signaling is configured to occur on PCells rather than SCells, and a control channel region of the particular cell is threshold highly congested, then it may be desirable to avoid using that cell as a PCell, but allow the cell to be used as an SCell.

UEs also may have different carrier aggregation capabilities. For example, some UEs may not support carrier aggregation, others may support aggregating up to two carriers, others may support aggregating up to three carriers, others may support aggregating up to four carriers, and still others may support aggregating up to five carriers. Additionally, for example, some UEs may support carrier aggregation for only TDD carriers, other UEs may support carrier aggregation for only FDD carriers, and still other UEs may support carrier aggregation for both TDD and FDD carriers. In further examples, the carrier aggregation capabilities of UEs may differ in still other ways.

Overview

As described above, in normal practice, UEs generally use information relating to reference signal strength as a basis to manage cell selection. For instance, when a UE is within coverage of multiple cells, the UE generally synchronizes with each cell, evaluates the reference signal strength of each cell, and selects the cell having the strongest signal strength as the cell that will then serve the UE. Unfortunately, UEs may be unaware of the carrier-aggregation policies of the cells under consideration for cell selection, and may not be configured to manage cell selection on the basis of such carrier-aggregation policies. In some instances, this may result in inefficient results.

For example, a UE may receive a first signal of a first cell having a first signal strength and receive a second signal of a second cell having a relatively weaker signal strength. Unbeknownst to the UE, a base station may not support carrier aggregation on the first cell, but the base station may support carrier aggregation on the second cell. In such a scenario, the UE may be able to receive comparatively better service (e.g., greater bandwidth with relatively weaker signal) if the base station serves the UE on the second cell. However, based on signal strength alone, the UE would select the first cell instead of the second cell, resulting in suboptimal service for the UE.

Disclosed herein are methods and corresponding systems to help address these problems. In accordance with this disclosure, each cell in a radio access network (RAN) broadcasts a respective carrier-aggregation policy of the cell on its air interface. A UE engaging in a cell selection process reads the respective carrier-aggregation policy of each cell under consideration and selects a cell on which to attach based at least in part on the respective carrier-aggregation policies of the cells. The UE can then attach to the selected cell so that the selected cell can then serve the UE.

In some aspects, the UE may evaluate the respective carrier-aggregation policy of each cell to determine an extent to which each cell can serve the UE with carrier aggregation. For example, the UE may evaluate the carrier-aggregation policy of each cell to (i) determine whether or not the cell can support carrier aggregation as a PCell, (ii) determine a total number of cells that can be aggregated using the cell as a PCell, and/or (iii) determine a total amount of bandwidth that can be aggregated using the cell as a PCell. For instance, the UE may select a cell that can support carrier aggregation for the UE instead of another cell that cannot support carrier aggregation for the UE. Additionally, for instance, the UE may select a cell that can be aggregated with a relatively greater number of carriers instead of another cell that can be aggregated with a relatively lesser number of carriers. Further, for instance, the UE may select a cell that can be aggregated with other cells to provide service over a relatively greater amount of bandwidth instead of another cell that can be aggregated with other cells to provide service over a relatively lesser amount of bandwidth (e.g., a cell spanning 20 MHz that can be aggregated with an SCell spanning 20 MHz may be selected instead of a cell spanning 10 MHz that can be aggregated with two SCells each spanning 10 MHz carriers so that the UE can be served over an aggregated bandwidth of 40 MHz instead of an aggregated bandwidth of 30 MHz).

In additional aspects, the UE can compare the respective carrier-aggregation policy of each cell to a carrier-aggregation capability of the UE and then select a cell based at least in part on such comparison(s). For example, a UE that is capable of aggregating up to three carriers may select a first cell that can be aggregated with two SCells (i.e., for a total of three aggregated carriers) instead of second cell that can be aggregated with four SCells (i.e., for a total of five aggregated carriers) since the UE cannot take advantage of the additional carrier aggregation capabilities of the second cell. Further, in this example, the UE may select the first cell instead of a third cell that can be aggregated with one SCell (i.e., for a total of two aggregated carriers) since the third cell would allow the UE to take advantage of the UE's carrier-aggregation capability to a lesser extent than the first cell. As another example, a UE that is capable of aggregating only a certain type of carrier (e.g., FDD carrier aggregation or TDD carrier aggregation) may select a particular cell that is capable of aggregating the same type of carrier instead of another cell that is capable of aggregating only a different type of carrier.

Accordingly, the methods and systems disclosed herein can help to manage cell selection such that a UE is more likely to operate in a cell having a carrier-aggregation policy that is commensurate with the UE's carrier aggregation capabilities. This may allow a UE to better take advantage of its carrier aggregation capabilities and thereby improve service for the UE. The methods and systems of this disclosure may also allow a RAN to better distribute UEs among cells in the RAN so that the benefits of carrier aggregation can be more effectively realized from a network level perspective.

Also in accordance with the disclosure, each cell periodically transmits a carrier-aggregation policy signal, indicating its respective carrier-aggregation policy, in a certain location on the air interface of the cell. Each cell also periodically transmits a synchronization signal in another location on the air interface of the cell. The locations on the air interface of the carrier-aggregation policy signal and the synchronization signal can have a specific, predefined relationship with each other. In this arrangement, the UE can first determine the location on the air interface of the synchronization signal (e.g., by detecting a known symbol value associated with the synchronization signal recurring at an expected rate) and then, based on the determined location on the air interface of the synchronization signal, the UE can determine the location on the air interface of the carrier-aggregation policy signal. The UE can then read the carrier-aggregation policy signal at its determined location on the air interface to determine the carrier-aggregation policy of the cell.

By way of example, the carrier-aggregation policy signal could be located on the air interface in the same time period as the synchronization signal but at subcarrier frequencies above and/or below the synchronization signal. For instance, the carrier-aggregation policy signal could be located in the same symbol period of the same sub-frame as the synchronization signal. Further, in other examples, the carrier-aggregation policy signal could be located on the air interface in different time periods and/or the same subcarrier frequencies as the synchronization signal.

In practice, the UE can select a cell on which to attach based on the carrier-aggregation policy of the cell and other criteria such as, for example, a reference signal strength of the cell. Alternatively, the UE can select a cell on which to attach based on the carrier-aggregation policy of the cell alone (i.e., without considering the reference signal strength of the cell). In either implementation, because the UE can determine the location of a carrier-aggregation policy signal based on the location of the synchronization signal, the UE can beneficially determine and evaluate the carrier-aggregation policy early in the cell selection process. In particular, the UE can evaluate the carrier aggregation policy of a cell before the UE evaluates the cell's reference signal strength and, thus, the UE can determine whether or not to consider that cell earlier in the cell selection process than if the UE performed cell selection based on reference signal strength alone. Indeed, in some instances, the UE may disregard certain cells early in the cell selection process if the UE determines that the cells' carrier-aggregation policies do not favorably compare to the carrier-aggregation capabilities of the UE, or for other reasons. As a result, a UE may more rapidly and efficiently carry out cell selection according to aspects of the present disclosure.

Accordingly, in one respect, disclosed is a method operable in a radio access network that includes one or more base stations each providing one or more cells. Each cell operates on a respective carrier and has a respective carrier-aggregation policy. Each cell also transmits a plurality of signals over a respective air interface. Each signal is transmitted at a different location on the respective air interface, and each location on the respective air interface is defined by time and/or frequency. The method includes a UE receiving a synchronization signal from one of the cells over the air interface of the cell. Further, the method includes determining a location on the air interface of the synchronization signal and, based on the determined location of the synchronization signal, determining a location on the air interface of a carrier-aggregation policy signal for the cell. The carrier-aggregation policy signal indicates the carrier-aggregation policy of the cell. The method also includes reading the carrier-aggregation policy signal at the determined location on the air interface to determine the carrier-aggregation policy of the cell, and deciding to attach the UE to the cell based on the determined carrier-aggregation policy. The method further includes attaching the UE to the cell.

In another respect, disclosed is a method operable in a radio access network that includes a plurality of cells each having a respective carrier-aggregation policy. Each cell transmits a plurality of signals over a respective air interface. The method includes a UE reading the respective carrier-aggregation policy for each cell on the air interface of the cell to determine the carrier-aggregation policy of the cell. The method also includes comparing the respective carrier-aggregation policies determined for the plurality of cells to each other, selecting a cell from the plurality of cells based on the comparison, and responsively attaching the UE to the selected cell.

Still further, in another respect, disclosed is a UE including a wireless communication interface for engaging in communication with one or more cells each over a respective air interface and a controller for processing communications that the wireless communication interface receives from the one or more cells. The respective air interface of each cell includes a plurality of locations for carrying signals transmitted by the cell, and each location on the air interface is defined by time and/or frequency. The controller is configured to: (i) receive, via the wireless communication interface, a synchronization signal from one cell of the one or more cells over the air interface of the cell, (ii) determine a location on the air interface of the synchronization signal, (iii) based on the determined location of the synchronization signal, determine a location on the air interface of a carrier-aggregation policy signal, which indicates a carrier-aggregation policy of the cell, (iv) read the carrier-aggregation policy signal at the determined location on the air interface to determine the carrier-aggregation policy of the cell, (v) decide to attach the UE to the cell based on the determined carrier-aggregation policy, and (vii) cause the UE to attach the cell.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
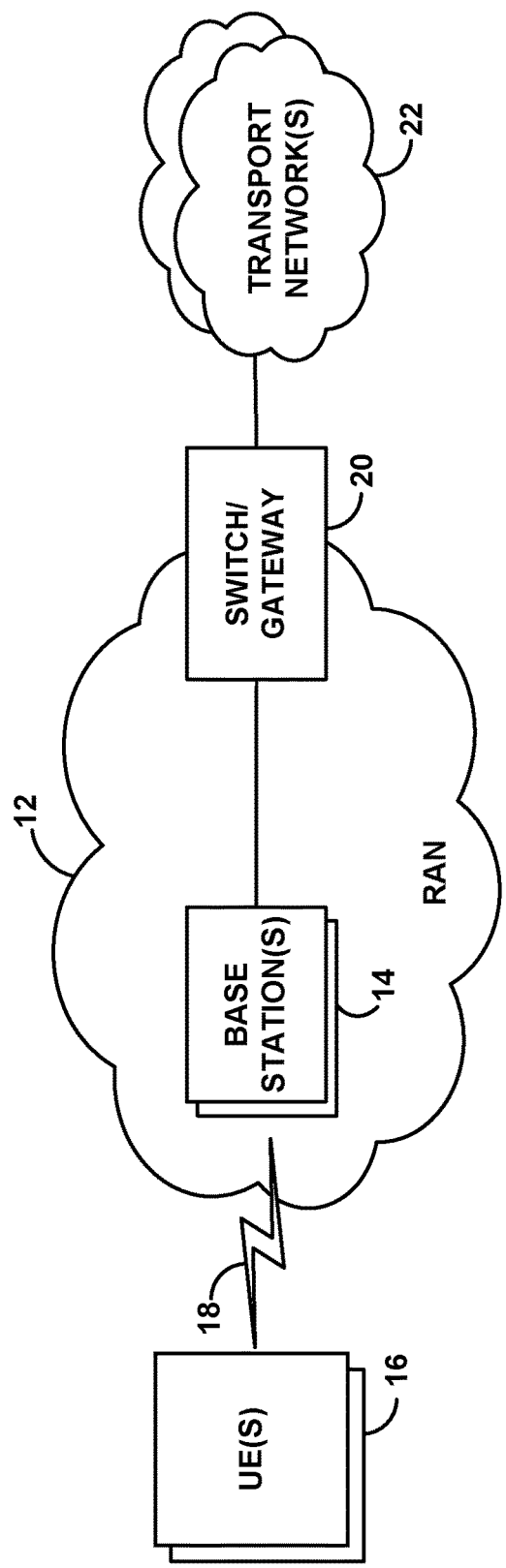
FIG. 1 is a simplified block diagram of an example wireless communication system in which the present disclosure can be implemented.

Referring to the drawings, as noted above, FIG. 1 is a simplified block diagram of an example wireless communication system in which the present disclosure can be implemented. It should be understood, however, that this and other arrangements described herein are set forth only as examples. As such, those skilled in the art will appreciate that other arrangements and elements (e.g., machines, interfaces, functions, orders, and grouping of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software.

FIG. 1 depicts the example communication system as including at its core a RAN 12 having one or more base stations 14, each arranged to serve UE(s) 16 in a respective coverage area through a respective air interface 18. The base station(s) can include a macro base station that is positioned at a fixed location and providing fairly wide coverage from that location. Additionally or alternatively, the base station(s) can include a small cell base station that is currently located at a particular location and may provide more restricted coverage from that location.

RAN 12 further includes by way of example a switch or gateway 20 that provides connectivity with one or more transport networks 22, such as the PSTN or the Internet for instance. With this arrangement, each UE that is in coverage of a base station and that is suitably equipped may register or attach with the RAN and may engage in air interface communication with the base station so as to communicate in turn with various remote entities on the transport network(s) and/or with the other UEs served by the RAN. Numerous variations from this arrangement are possible, however. For instance, the RAN may include more than one switch or gateway and may include various components between each switch or gateway and the transport network(s).

As noted above, the air interface 18 may be configured according to a particular air interface protocol (such as, e.g., one of the example air interface protocols described above), and a UE and base station may be programmed or otherwise configured to operate according to that protocol. In accordance with the air interface protocol, air interface resources are mapped in the time domain and/or the frequency domain to provide discrete locations on a given air interface for carrying communications between the UEs and the base stations.

Figure 2:
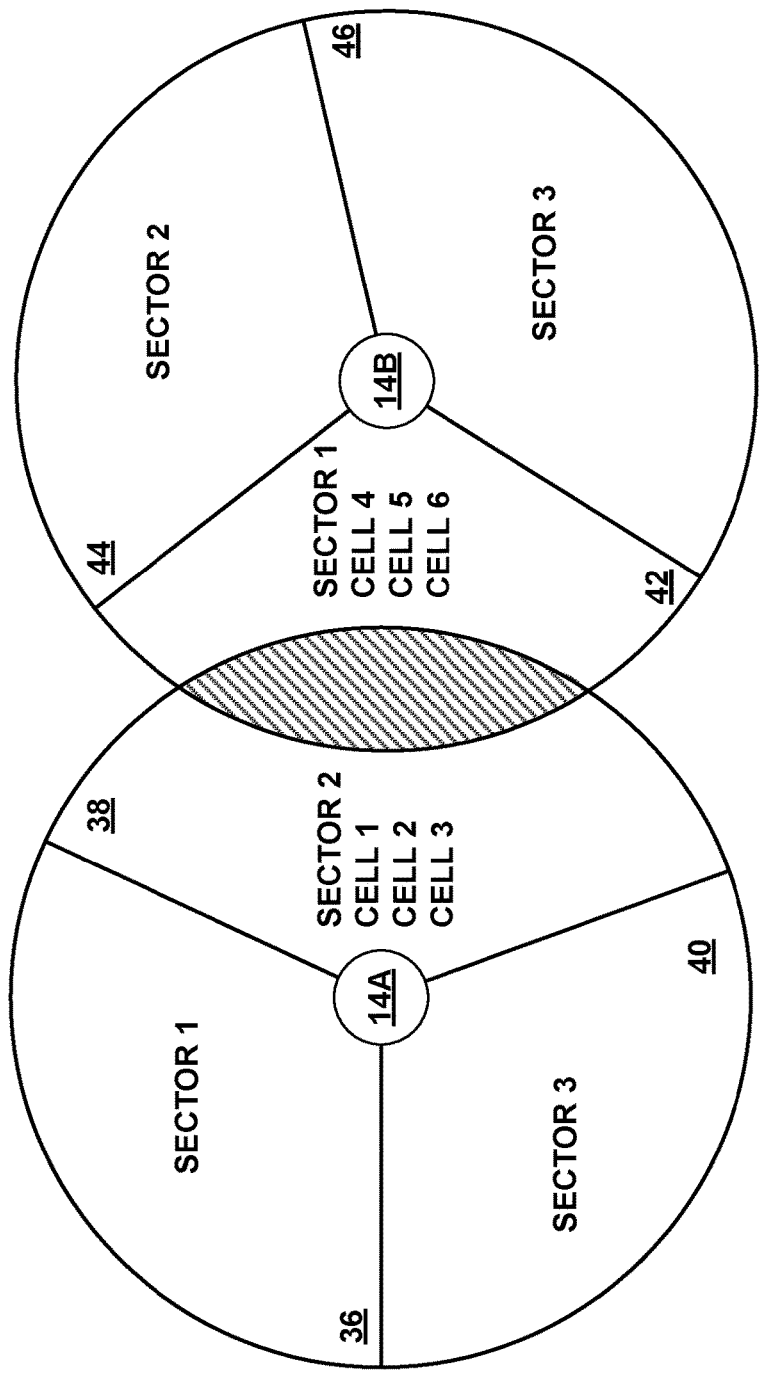
FIG. 2 is an illustration of an example wireless communication system.

FIG. 2 depicts the example wireless communication system as including multiple sectors 36, 38, 40 provided by a first base station 14A as well as multiple sectors 42, 44, 46 provided by a second base station 14B in RAN 12. In one example, the first base station 14A may provide multiple co-located cells within the sector 38, the second base station 14B may provide multiple co-located cells within the sector 42, and the base stations 14A, 14B may provide one or more cells in each of the remaining sectors 36, 40, 44, 46. More specifically, the first base station 14A may provide three cells having respective cell IDs of 1, 2, and 3 within the sector 38, and the second base station 14B may provide three cells having respective cell IDs of 4, 5, and 6 within the sector 42.

Figure 3:
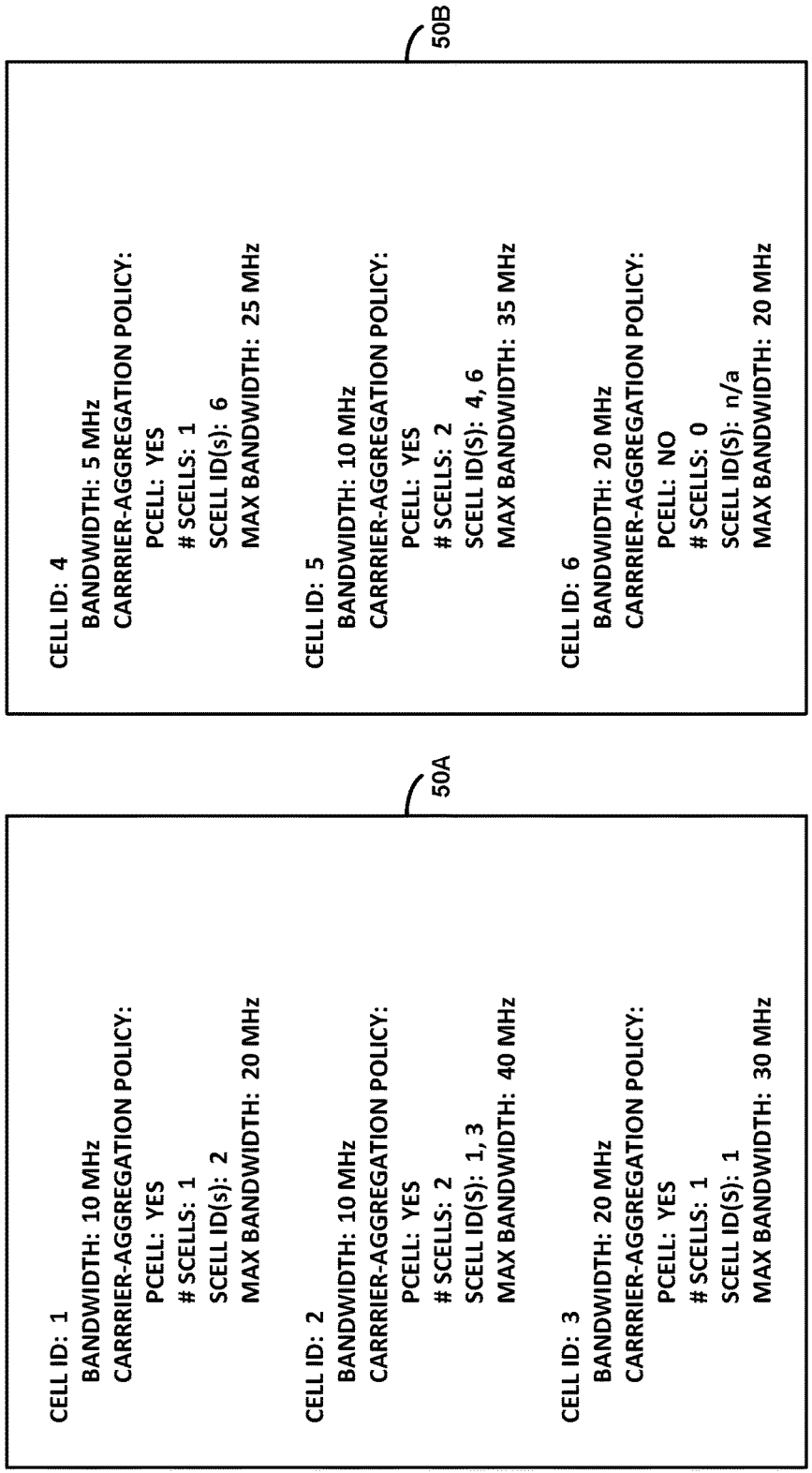
FIG. 3A is an illustration of example carrier-aggregation policies.
FIG. 3B is another illustration of example carrier-aggregation policies.

In this arrangement, the first base station 14A and the second base station 14B each provide a plurality of cells each operating on a respective carrier. As noted above, the first base station 14A may specify a carrier-aggregation policy respectively for each cell provided by the first base station 14A, and the second base station 14B may specify a carrier-aggregation policy respectively for each cell provided by the second base station 14B. In practice, the carrier-aggregation policies implemented by the base stations 14A, 14B may take a number of forms. FIGS. 3A and 3B are illustrations of carrier-aggregation policies 50A, 50B that the first base station 14A and the second base station 14B, respectively, may implement by way of example. In particular, FIG. 3A depicts three example carrier-aggregation policies that the first base station 14A implements for cell 1, cell 2, and cell 3 respectively, and FIG. 3B depicts three example carrier-aggregation policies that the second base station 14B implements for cell 4, cell 5, and cell 6 respectively.

As shown in FIG. 3A, the example carrier-aggregation policy for cell 1 indicates that cell 1 may be configured as a PCell together with cell 2 as an SCell, providing a maximum carrier-aggregation bandwidth of 20 MHz. Further, the example carrier-aggregation policy for cell 2 indicates that cell 2 may be configured as a PCell together with cells 1 and/or 3 as an SCell(s), providing a maximum carrier-aggregation bandwidth 40 MHz. And the example carrier-aggregation policy for cell 3 indicates that cell 3 may be configured as a PCell together with cell 1 as an SCell, providing a maximum carrier-aggregation bandwidth of 30 MHz.

As shown in FIG. 3B, the example carrier-aggregation policy for cell 4 indicates that cell 4 may be configured as a PCell together with cell 6 as an SCell, providing a maximum carrier-aggregation bandwidth of 25 MHz. Further, the example carrier-aggregation policy for cell 5 indicates that cell 5 may be configured as a PCell together with cells 4 and/or 6 as an SCell(s), providing a maximum carrier-aggregation bandwidth 35 MHz. And the example carrier-aggregation policy for cell 6 indicates that cell 6 cannot be configured as a PCell together with either cell 4 or cell 5 as an SCell and, thus, cell 6 provides a maximum bandwidth of 20 MHz.

The carrier-aggregation policies depicted in FIGS. 3A and 3B are provided for purposes of example. In other arrangements, a carrier-aggregation policy may include more or less information. For instance, in another arrangement, a carrier-aggregation policy may not indicate the maximum carrier-aggregation bandwidth. Additionally, for instance, a carrier-aggregation policy may indicate a type of carrier that can be aggregated such as, for example, FDD carriers and/or TDD carriers.

In line with the discussion above, each cell periodically transmits a carrier-aggregation policy signal, indicating its respective carrier-aggregation policy, in a certain location on the air interface of the cell. Each cell also periodically transmits a synchronization signal in another location on the air interface of the cell. The locations on the air interface of the carrier-aggregation policy signal and the synchronization signal can have a specific, predefined relationship with each other so that a UE having knowledge of the location of the synchronization signal can readily also find the carrier-aggregation policy signal.

Figure 4:
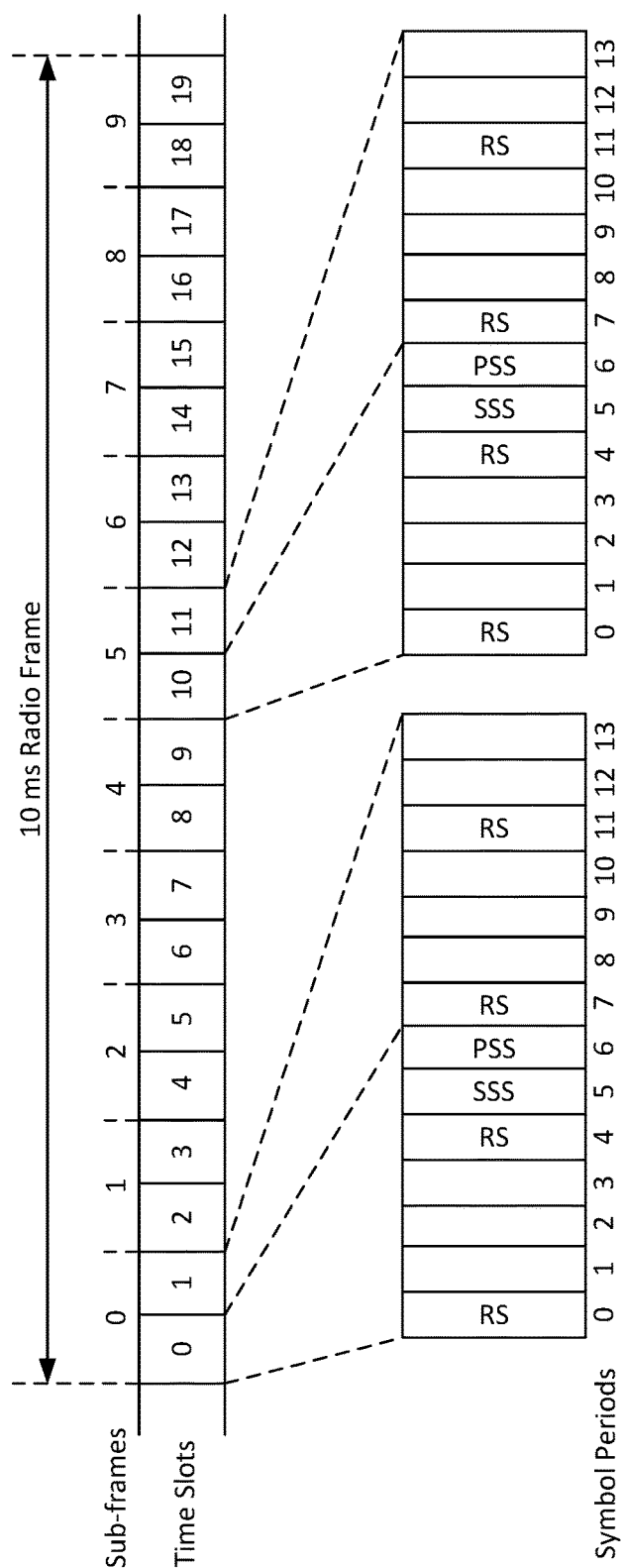
FIG. 4 is an illustration of an example frame structure for an air interface.

FIG. 4 depicts an example frame structure showing how synchronization signals may be transmitted on an air interface in the time domain according to LTE. As shown in FIG. 4, the air interface is divided into a continuum of 10-millisecond (ms) frames, each frame is divided into ten 1 ms sub-frames, and each sub-frame is divided into two 0.5 ms slots. Each 1 ms downlink sub-frame is then further divided into 14 symbol time periods, each spanning 66.7 microseconds plus an added 4.69 microsecond guard band (cyclic prefix). As shown in FIG. 4, the PSS is transmitted in the last symbol period of the first slot (i.e., symbol period 6) within the first and sixth sub-frames (i.e., sub-frame 0 and sub-frame 5) of every frame, and the SSS is transmitted in the second to last symbol period (i.e., symbol period 5) of those same slots and sub-frames.

Also, in accordance with the LTE protocol, the downlink of each cell spans a frequency bandwidth such as 1.4 MHz, 3 MHz, 5 MHz, 10 MHz, 15 MHz, or 20 MHz, and that frequency bandwidth is divided into 15 kHz subcarriers (i.e., subcarriers spaced apart from each other by 15 kHz). With this arrangement, each sub-frame thus defines an array of resource elements, each centered on a 15 kHz subcarrier and spanning a symbol period, and each such resource element may effectively carry a single OFDM symbol representing communication data.

Figure 5:
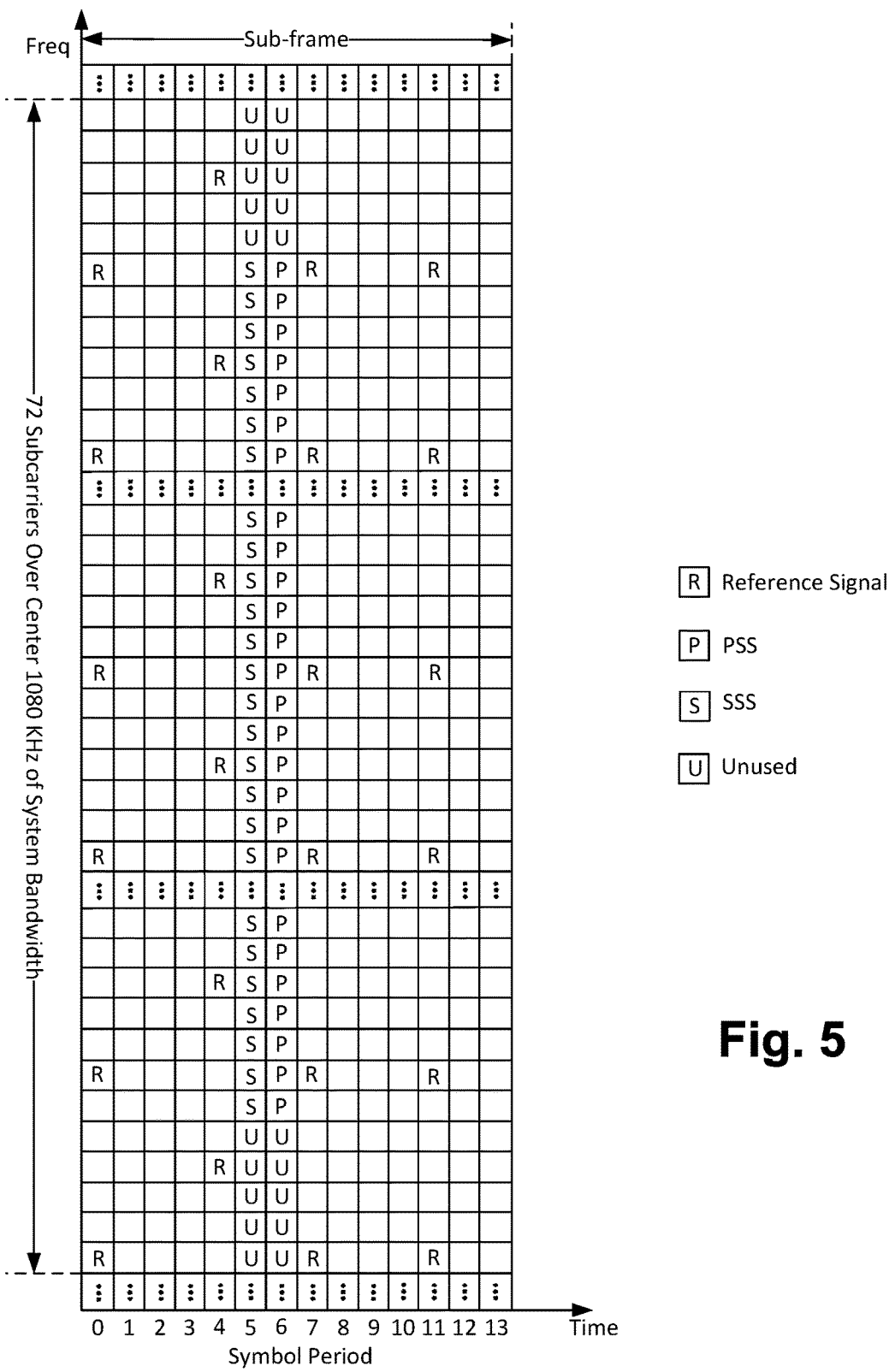
FIG. 5 is an illustration of an example array of resource elements on an air interface.

FIG. 5 depicts an example array of resource elements further showing how a cell may transmit synchronization signals in the time domain and the frequency domain on an air interface according to LTE. As shown in FIG. 5, resource elements for one sub-frame in the time domain (e.g., sub-frame 0 or sub-frame 5) are mapped over 72 subcarriers at the center of the cell's carrier frequency bandwidth (e.g., the center 1.08 MHz of bandwidth). In this example, the center 62 subcarriers in symbol period 6 are reserved for transmitting the PSS and the center 62 subcarriers in symbol period 5 are reserved for transmitting the SSS (respectively labeled as "P" and "S" in FIG. 5). As a result, in symbol period 6 and symbol period 5, there are five unused resource elements at subcarriers above each of the PSS and SSS and five unused resource elements at subcarriers below each of the PSS and SSS. These unused resource elements are labeled as "U" in FIG. 5. FIG. 5 further includes resource elements labeled as "R," which are reserved for transmitting a reference signal on the air interface. As noted above, a UE may use the reference signals to determine a signal strength of the cell.

Figure 6A:
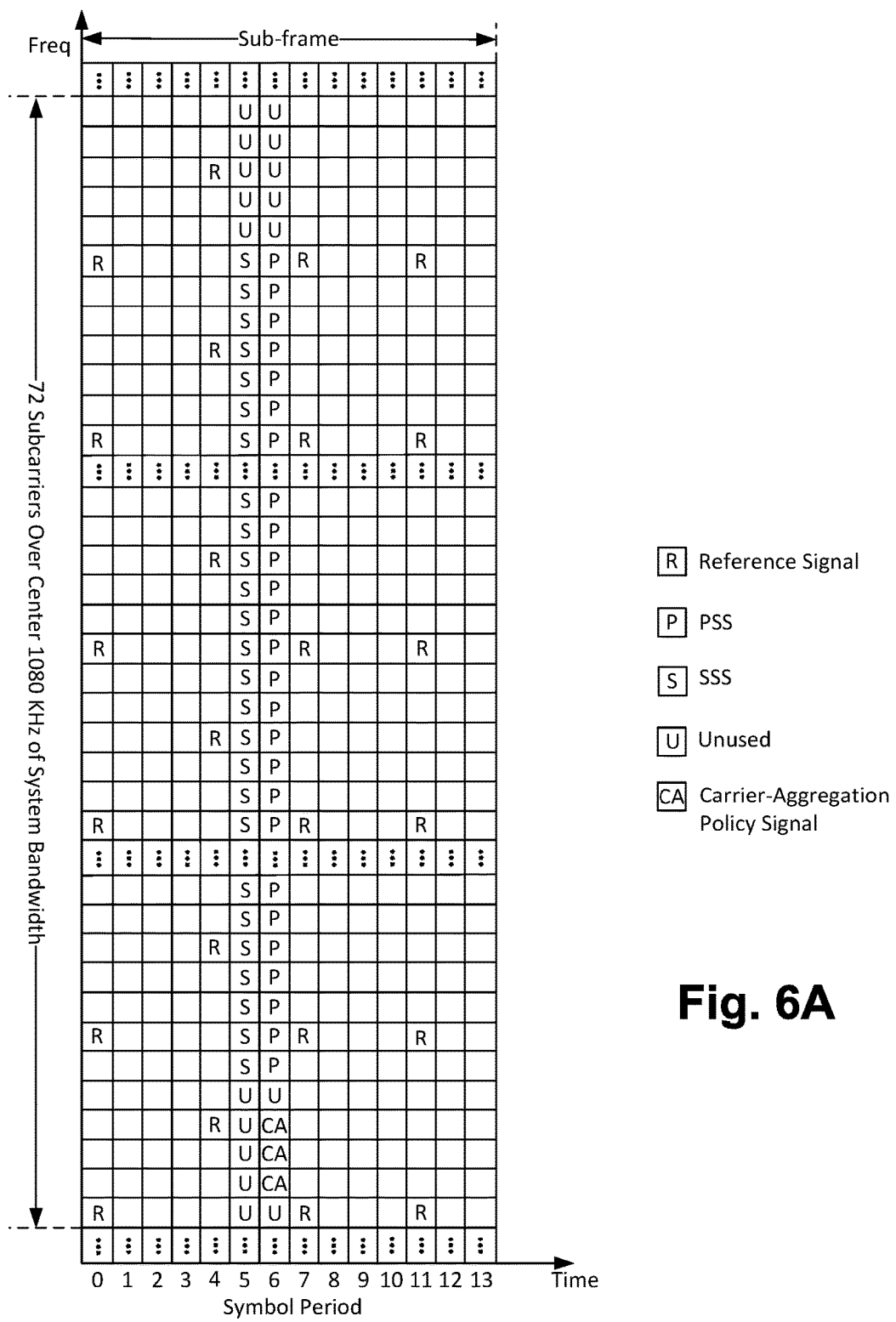
FIG. 6A is an illustration of an example array of resource elements on an air interface in accordance with exemplary embodiments.
Figure 6B:
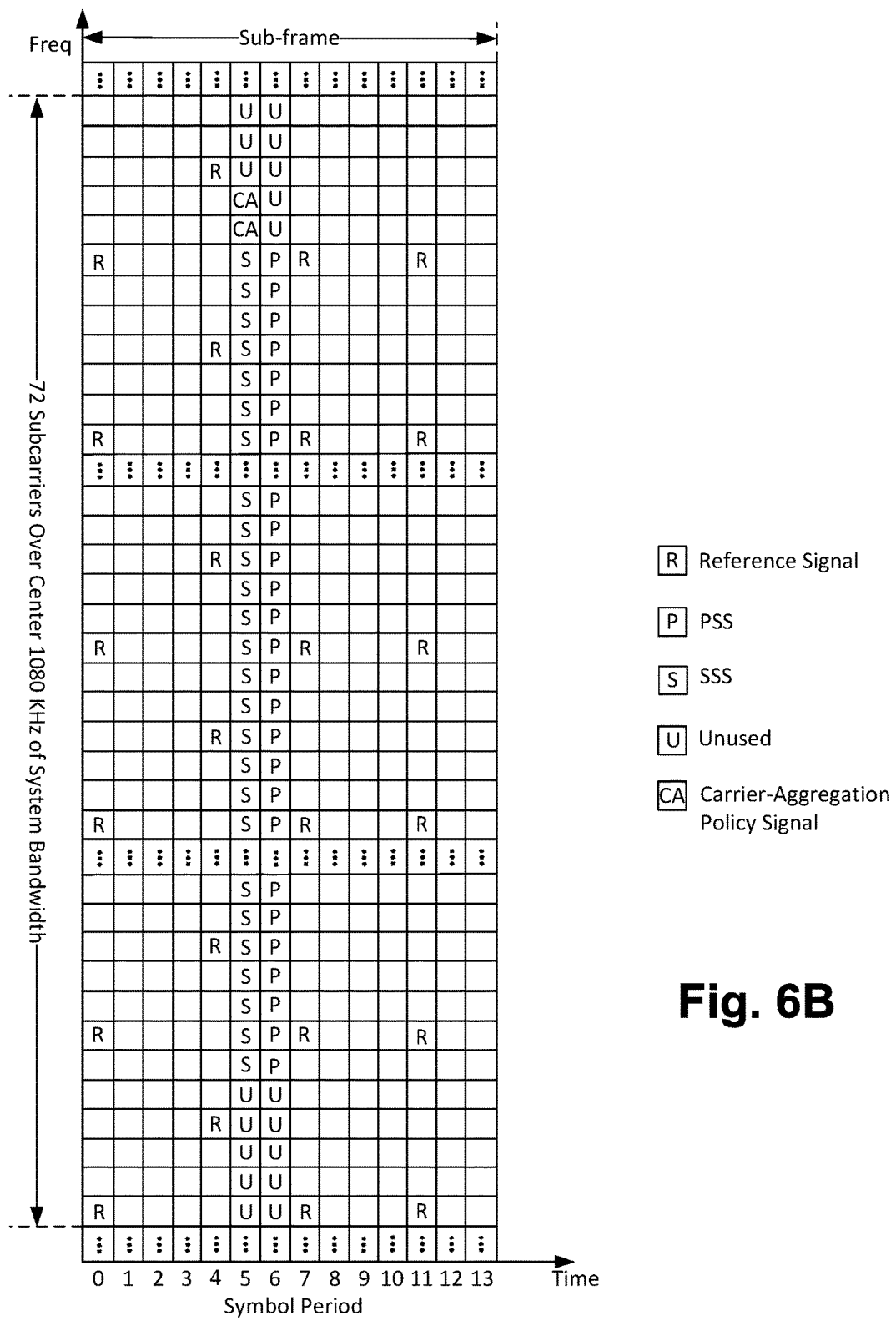
FIG. 6B is an illustration of another example array of resource elements on an air interface in accordance with exemplary embodiments.
Figure 6C:
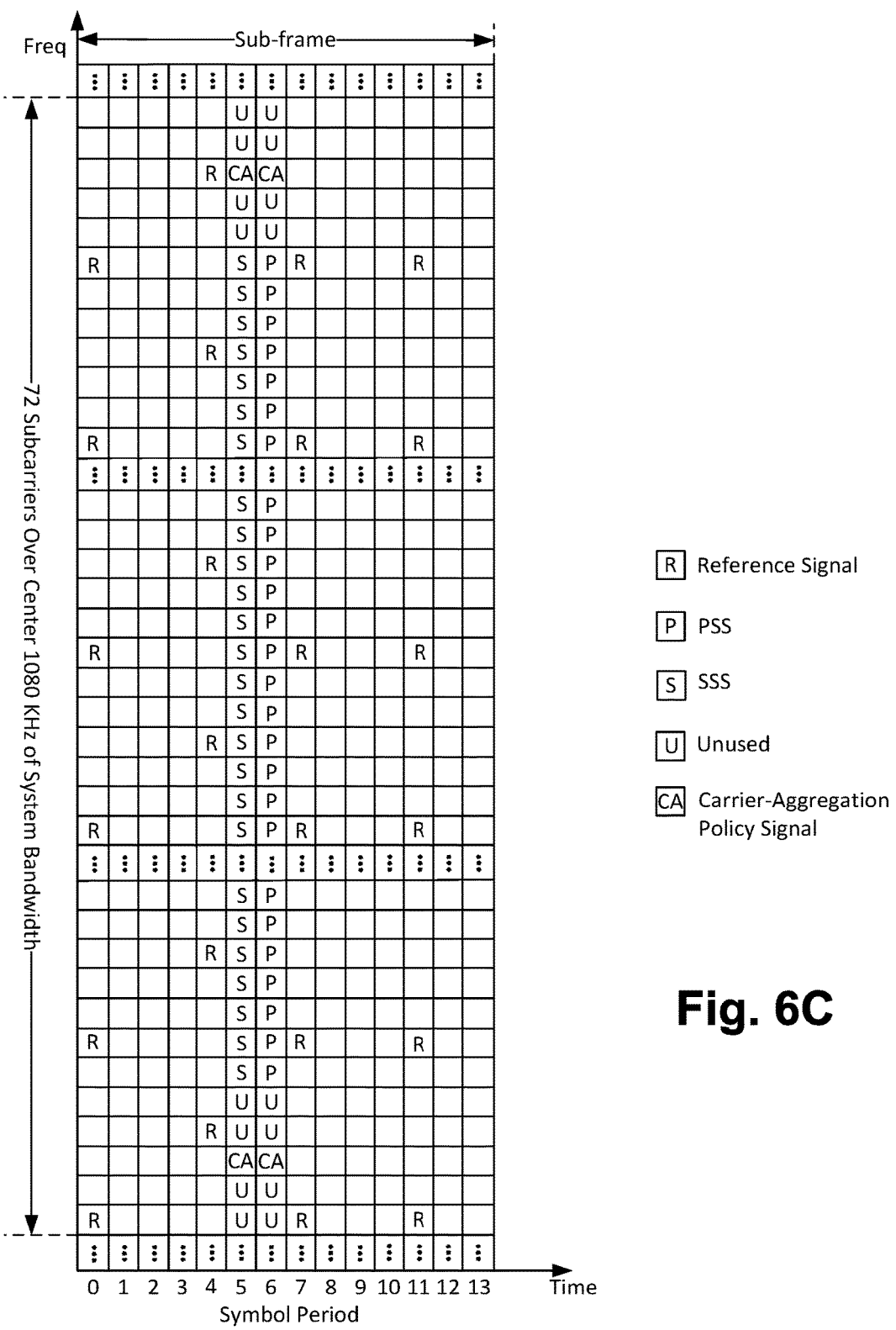
FIG. 6C is an illustration of another example array of resource elements on an air interface in accordance with exemplary embodiments.

In one aspect of the present disclosure, the cell transmits the carrier-aggregation policy signal in one or more of the unused resource elements above and/or below the PSS and/or the SSS (i.e., at different subcarrier(s) in the same symbol period as the PSS and/or the SSS). FIGS. 6A-6C depict example implementations for transmitting the carrier-aggregation policy signal in such unused resource elements according to this aspect of the disclosure. The example resource element arrays shown in FIGS. 6A-6C are similar to the example resource element array shown in FIG. 5, except that the arrays shown in FIGS. 6A-6C provide for transmitting the carrier-aggregation policy signal in one or more resource elements indicated by "CA" in FIGS. 6A-6C.

In the example depicted by FIG. 6A, the cell transmits the carrier-aggregation policy signal in three resource elements located at subcarriers below the PSS in symbol period 6. In the example depicted by FIG. 6B, the cell transmits the carrier-aggregation policy signal in two resource elements located at subcarriers above the SSS in symbol period 5. And, in the example depicted by FIG. 6C, the cell transmits the carrier-aggregation policy signal in a resource element located at a subcarrier above the PSS in symbol period 6, a resource element located at a subcarrier below the PSS in symbol period 6, a resource element located at a subcarrier above the SSS in symbol period 5, and a resource element located at a subcarrier below the SSS in symbol period 5. Thus, as shown in the examples of FIGS. 6A-6C, the cell can transmit the carrier-aggregation policy in resource elements located in the same symbol period as the PSS, resource elements located in the same symbol period as the SSS, or resource elements located in both the symbol period of the PSS and the symbol period of the SSS in accordance with aspects of the disclosure. The resource element arrays depicted in FIGS. 6A-6C are provided by way of example. Other examples are also possible.

Figure 7:
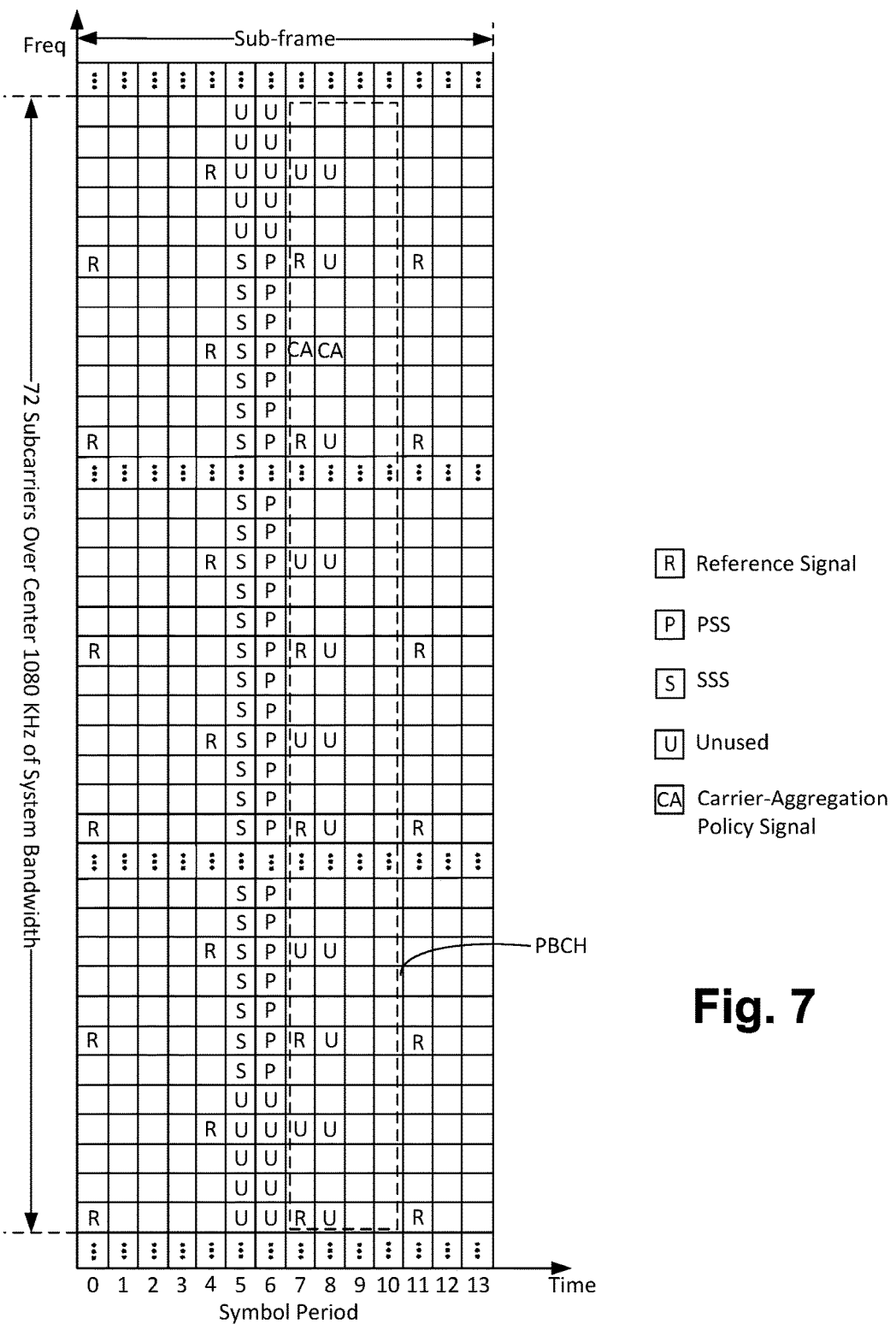
FIG. 7 is an illustration of another example array of resource elements on an air interface in accordance with exemplary embodiments.

According to additional or alternative aspects of the disclosure, the cell can transmit the carrier-aggregation policy signal in one or more resource elements located in a symbol period that is different from the symbol period of the PSS and/or the SSS. In particular, the cell can transmit the carrier-aggregation policy signal in one or more unused resource elements located in a physical broadcast channel (PBCH) region of the air interface. The PBCH region may include reserved resource elements for transmitting various parameters used by the UE during the initial access procedure such as, for example, an indication of downlink system bandwidth. In LTE, the cell transmits the PBCH in the center 72 subcarriers of symbol periods 0 to 3 in sub-frame 0. The PBCH region typically includes 36 unused resource elements. By way of example, FIG. 7 depicts an example array of resource elements in which the cell transmits the carrier-aggregation policy in two of the 36 unused resource elements of the PBCH region.

Transmitting the carrier-aggregation policy signal in the unused resource elements above and/or below the synchronization signal(s) (i.e., in the same symbol period as the synchronization signal(s)) and/or in the unused resource elements in the PBCH region may beneficially allow the cell to transmit the carrier-aggregation policy signal without consuming additional air interface resources that are typically used to communicate other data.

Further in line with the discussion above, when a UE enters coverage of one or more cells, the UE may engage in a cell selection process to synchronize with the cell(s) and select a cell on which to attach so that the UE can then be served by that cell. In one example scenario, when a UE powers on, the UE may use the cell selection process to select an initial cell on which the UE can attach and thereby gain access to the RAN. In another example scenario, while the UE is attached to one cell, the UE may use the cell selection process to select another cell and then attach to that other cell (e.g., via a handover process).

In accordance with the present disclosure, a UE engaging in the cell selection process can read the respective carrier-aggregation policy transmitted by each cell under consideration and select a cell on which to attach based at least in part on the respective carrier-aggregation policies of the cell(s). To do so, the UE first determines the location on the air interface of the synchronization signal(s) transmitted by the cell and, then based on the determined location of the synchronization signal(s), the UE determines the location on the air interface of the carrier-aggregation policy signal. Once the UE determines the location on the air interface of the carrier-aggregation policy signal, the UE reads the carrier aggregation policy at that determined location.

The UE can first determine the location on the air interface of the synchronization signal by detecting a known symbol value associated with the synchronization signal recurring at an expected rate. In LTE, for example, the PSS value is represented by a 62-symbol Zadoof-Chu sequence. As such, the PSS consists of 62 symbols each transmitted at the same time but at a different frequency. The UE can thus detect each of the 62 symbols at a respective one of the frequencies during a 66.67 microsecond time period every 5 ms. The detected frequency of each symbol corresponds to a respective one of the 62 subcarriers of the PSS (as depicted and described above with respect to FIG. 5). The detected time period for each symbol corresponds to the symbol period and sub-frame of the PSS (i.e., symbol period 6 of sub-frame 0 and sub-frame 5). Thus, by detecting the 62-symbol Zadoof-Chu sequence associated with the PSS value, the UE can determine the resource elements defining the location on the air interface of the PSS.

The UE can then determine the location on the air interface of the SSS based on the determined location of the PSS. In particular, the UE can be programmed to determine that the SSS is located at the 62 resource elements in the symbol period immediately before the resource elements of the PSS (i.e., at the center 62 subcarriers of symbol period 5 in sub-frame 0 and sub-frame 5). After the UE determines the location on the air interface of the SSS, the UE reads the SSS value at that determined location.

As noted above, the location on the air interface of the carrier-aggregation policy signal can have a specific, predefined relationship to the location on the air interface of the synchronization signal(s). Having knowledge of this relationship and having determined the location on the air interface of the synchronization signal(s), the UE can thus determine the location on the air interface of the carrier-aggregation policy signal. For instance, in the example of FIG. 6A, the UE can be programmed to locate the carrier-aggregation policy signal in the three resource elements at the second, third, and fourth subcarriers below the PSS signal and within the same symbol period as the PSS. In the example of FIG. 6B, the UE can be programmed to locate the carrier-aggregation policy signal in the two resource elements at the subcarriers immediately above the SSS and within the same symbol period as the SSS. A UE can be similarly programmed to determine the location of the carrier-aggregation policy signal in the examples of FIGS. 6C and 7 based on the determined location of the PSS and/or SSS and prior knowledge of the relationship between the locations of the carrier-aggregation policy signal and the PSS/SSS.

As discussed above, responsive to the UE determining the location on the air interface of the carrier-aggregation policy signal, the UE reads the carrier-aggregation policy signal at that location to determine the carrier-aggregation policy of the cell. The carrier-aggregation policy can be indicated by the carrier-aggregation policy signal in various ways. As one example, the carrier-aggregation policy can be represented by a binary code mapped to the resource elements of the carrier-aggregation policy signal. For instance, in one example implementation, the cell can transmit the carrier-aggregation policy signal or provide a null in each of two resource elements such that a first one of the two resource elements represents a first bit of the binary code and a second one of the two resource elements represents a second bit of the binary code. In this example, the UE can employ a table that maps the binary codes to carrier-aggregation policies, and the UE can be programmed to refer to the table to determine a cell's carrier-aggregation policy. Table 1 below shows an example of one such table.

TABLE 1

| First Resource Element | Second Resource Element | Corresponding Binary Code | Carrier Aggregation Policy |
|---|---|---|---|
| Null | Null | 00 | Cell cannot be used as a PCell with any other cell as an SCell |
| Null | Signal Detected | 01 | Cell can be used as a PCell with up to one other cell as an SCell |

TABLE 1-continued

| First Resource Element | Second Resource Element | Corresponding Binary Code | Carrier Aggregation Policy |
|---|---|---|---|
| Signal Detected | Null | 10 | Cell can be used as a PCell with up to two other cells as SCells |
| Signal Detected | Signal Detected | 11 | Cell can be used as a PCell with up to three other cells as SCells |

This table and the information therein may take various other forms as well.

In other examples, the carrier-aggregation policy signal can be transmitted in a greater or fewer number of resource elements to indicate carrier-aggregation policies with greater or lesser granularity. For instance, the binary codes can additionally or alternatively indicate any of the other types of carrier-aggregation policy information described above (e.g., the number of SCells that can be aggregated with the cell as a PCell, the identity of those SCells, the bandwidth of the SCells, the maximum bandwidth that can be achieved using the cell as a PCell with the SCells, TDD carrier aggregation v. FDD carrier aggregation, etc).

In still other examples, the carrier-aggregation policy of each cell can be encoded and symbol-mapped to a set of symbols, which can be a real or complex value. The symbols can thus represent one or more aspects of the carrier-aggregation policies described above. For example, one set of symbol(s) may be used to indicate the number of carriers that can be aggregated and another set of symbol(s) symbol may be used to indicate the maximum bandwidth that can be aggregated according to the carrier-aggregation policy. Additional examples are also possible.

Once the UE determines the carrier-aggregation policy of each cell under consideration for cell selection, the UE can evaluate the respective carrier-aggregation policies and select one of the cells based on the evaluation. In one aspect, the UE can determine an extent to which each cell can support carrier-aggregation using that cell as PCell with other cell(s) as SCell(s). For example, the UE may select a particular cell based on a number of carriers (i.e., SCells) that can be aggregated using the cell as a PCell. For instance, in the example depicted in FIG. 3A, a UE considering cell 1, cell 2, and cell 3 during the cell selection process can determine that the respective carrier-aggregation policies specify that (i) cell 1 can be aggregated with one SCell when cell 1 is used as a PCell, (ii) cell 2 can be aggregated with two SCells when cell 2 is used as a PCell, and (iii) cell 3 can be aggregated with one SCell when cell 3 is used as a PCell. Based on this determination, the UE may select cell 2 rather than cell 1 or cell 3 since cell 2 may permit the UE to receive service on three carriers as opposed to two carriers as permitted by cell 1 and cell 3. In this way, the UE may select a cell from among multiple cells in a manner that maximizes the number of carriers that may be aggregated to serve the UE.

As another example, the UE may select a particular cell based on a maximum bandwidth that can be aggregated using the cell as a PCell. For instance, in the example depicted in FIG. 3B, a UE considering cell 4, cell 5, and cell 6 during the cell selection process can determine that the respective carrier-aggregation policies specify that (i) cell 4 can be aggregated with an SCell to achieve a maximum bandwidth of 25 MHz, (ii) cell 5 can be aggregated with SCells to achieve a maximum bandwidth of 35 MHz, and (iii) cell 6 cannot be aggregated but can achieve a maximum bandwidth of 20 MHz. Based on this determination, the UE may select cell 5 rather than cell 4 or cell 6 since cell 5 may permit the UE to receive service over a bandwidth of 35 MHz as opposed to a bandwidth of 25 MHz or 20 MHz as permitted by cells 4 and 6, respectively. In this way, the UE may select a cell from among multiple cells in a manner that maximizes the total bandwidth that may be aggregated to serve the UE.

In another aspect, the UE can evaluate the respective carrier-aggregation policies by comparing each respective carrier-aggregation policy to a carrier-aggregation capability of the UE. In doing so, the UE can determine whether and/or to what extent each cell's carrier-aggregation capabilities are commensurate with the carrier-aggregation capabilities of the UE. And the UE may then select a cell on that basis. This may help to distribute UEs throughout the RAN in a manner that allows the benefits of carrier aggregation to be more effectively realized from a network level perspective.

For example, the UE can compare the respective carrier-aggregation policy determined for each cell to the carrier-aggregation capability of the UE to determine whether or not the cell can support carrier aggregation as a PCell for the UE. For instance, a carrier-aggregation policy may specify that a particular cell cannot support carrier aggregation in any capacity, whereas the UE may be capable of carrier aggregation. In this instance, the UE may select another cell that can support carrier aggregation instead of the particular cell. Conversely, if a UE cannot support carrier aggregation, the UE may select a cell that also cannot support carrier aggregation rather than a cell that can support carrier aggregation.

Additionally, for example, the UE can compare the respective carrier-aggregation policy determined for each cell to the carrier-aggregation capability of the UE to determine whether the UE and the cell can support the same type of carrier aggregation. As noted above, UEs and cells may support various different types of carrier aggregation such as, for example, TDD carrier aggregation and/or FDD carrier aggregation. In instances where the UE and a cell support only different types of carrier aggregation, the UE and the cell may be generally considered to support carrier aggregation but the UE would not be able to take advantage of carrier aggregation if it was served by the cell as a PCell. In this instance, the UE may decide to select a different cell, namely one that supports the same type of carrier aggregation as the UE.

Further, for example, the UE can compare the respective carrier-aggregation policy determined for each cell to the carrier-aggregation capability of the UE to determine an extent to which the carrier-aggregation policy of the cell is commensurate with the carrier-aggregation capability of the UE. In one implementation, the UE may then select the cell having a respective carrier-aggregation policy that the UE determines is most commensurate with the carrier-aggregation capability of the UE.

For instance, a UE may determine that a first cell can provide a first extent of carrier aggregation, a second cell can provide a second extent of carrier aggregation, and a third cell can provide a third extent of carrier aggregation based on respective carrier-aggregation polices of the first, second, and third cells. The UE may further determine that the UE is capable of a fourth extent of carrier aggregation. The UE may then compare each of the first, second, and third extents to the fourth extent (e.g., by comparing the number of carriers that can be aggregated using each cell as PCell to the number of carriers the UE can aggregate). In one scenario, the UE may determine that the first and second extents are less than or equal to the fourth extent, but the third extent is greater than the fourth extent (i.e., the UE may determine that the third cell can provide a greater extent of carrier-aggregation than the UE can use). On the basis of this determination, the UE may disregard the third cell from further consideration. The UE may then compare the first extent to the second extent, and determine that the first extent is greater than the second extent. The UE may then select the first cell based on that determination. In this way, the UE may select a cell such that the carrier-aggregation capability of the UE does not exceed the carrier-aggregation capability provided by the selected cell when other cells under consideration can provide a carrier-aggregation capability that is less than or equal to the carrier-aggregation capability of the UE.

In another example implementation, a UE may be capable of aggregating up to a number of carriers, N (where N>1). The UE may compare the determined carrier-aggregation policy of each cell to the carrier-aggregation capability of the UE to determine, based on the carrier-aggregation policy, whether the cell can be aggregated with at least N−1 other carriers to achieve carrier aggregation on N carriers. The UE may select a cell on which to attach on the basis of the UE determining that the cell can be aggregated with at least N−1 carriers. Other examples are also possible.

In some aspects, the UE can select a cell on which to attach based on the evaluation of the respective carrier-aggregation policy of each cell alone (i.e., without considering the reference signal strength of each cell). In other aspects, the UE can select the cell on which to attach based on the respective carrier-aggregation policy determined for each cell and other criteria such as, for example, a reference signal strength of each cell. In one example, the UE may determine and evaluate the respective carrier-aggregation policy of each cell as a basis for deciding whether to determine the reference signal strength of the cell. Based on this decision, the UE will either (i) determine the reference signal strength of the cell and use it as basis for selecting the cell or (ii) disregard the cell from further consideration during the cell selection process. The UE may thus filter out certain cells on the basis of carrier-aggregation policy prior to evaluating reference signal strength. As a result, a UE may more rapidly and efficiently carry out cell selection according to aspects of the present disclosure.

According to aspects of the disclosure, the UE may evaluate the carrier-aggregation policy and/or the reference signal of each cell using any one or a combination of the approaches described above. For instance, the UE may use both the number of carriers that can be aggregated and the maximum bandwidth that can be aggregated when a given cell is used as a PCell as factors for deciding whether to attach to the cell or selecting the cell from among other cells. The above described evaluations and comparisons are provided by way of example. Other examples are also possible.

Figure 8:
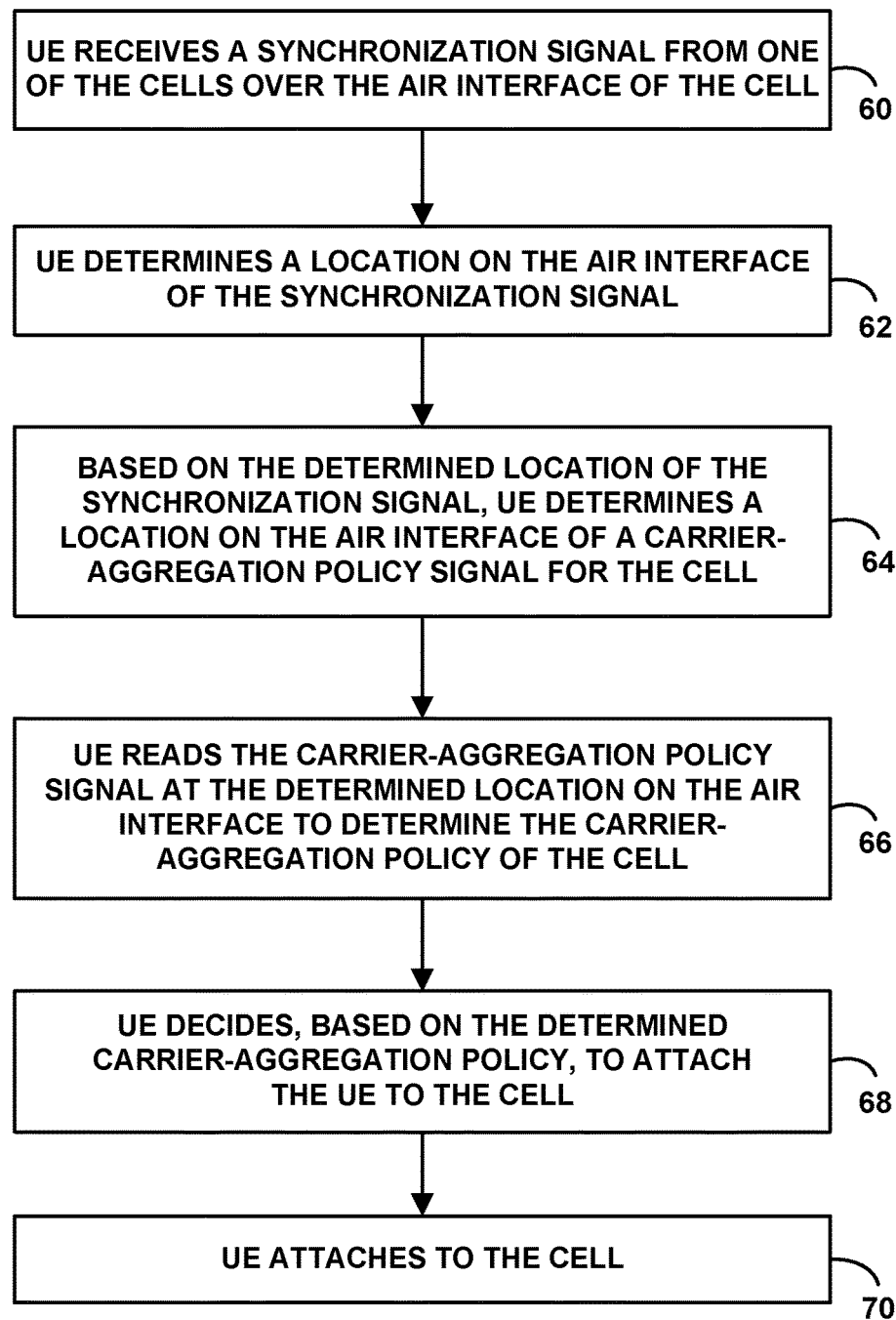
FIG. 8 is a flow chart depicting functions that can be carried out in accordance with the present disclosure.

FIG. 8 is next a flow chart depicting an example set of operations that can be carried out in an implementation of the process according to some aspects of the disclosure. In the illustrated example, the process is operable in a radio access network including one or more bases stations that each provide one or more cells. Each of the one or more cells operate on a respective carrier and have a respective carrier-aggregation policy. Each cell transmits a plurality of signals over an air interface and each signal is transmitted at a different location on the air interface. Further, each location on the air interface is defined by time and/or frequency.

As shown in FIG. 8, at block 60, the process begins with a UE receiving a synchronization signal from one of the cells over the air interface of the cell. At block 62, the UE determines a location on the air interface of the synchronization signal. Based on the location of the synchronization signal determined at block 62, the UE determines a location on the air interface of a carrier-aggregation policy signal for the cell at block 64. The carrier-aggregation policy signal indicates the carrier-aggregation policy of the cell. At block 66, the UE reads the carrier-aggregation policy signal at the determined location on the air interface to determine the carrier-aggregation policy of the cell. At block 68, the UE decides, based on the determined carrier-aggregation policy, to attach the UE to the cell. At block 70, the UE attaches to the cell.

Figure 9:
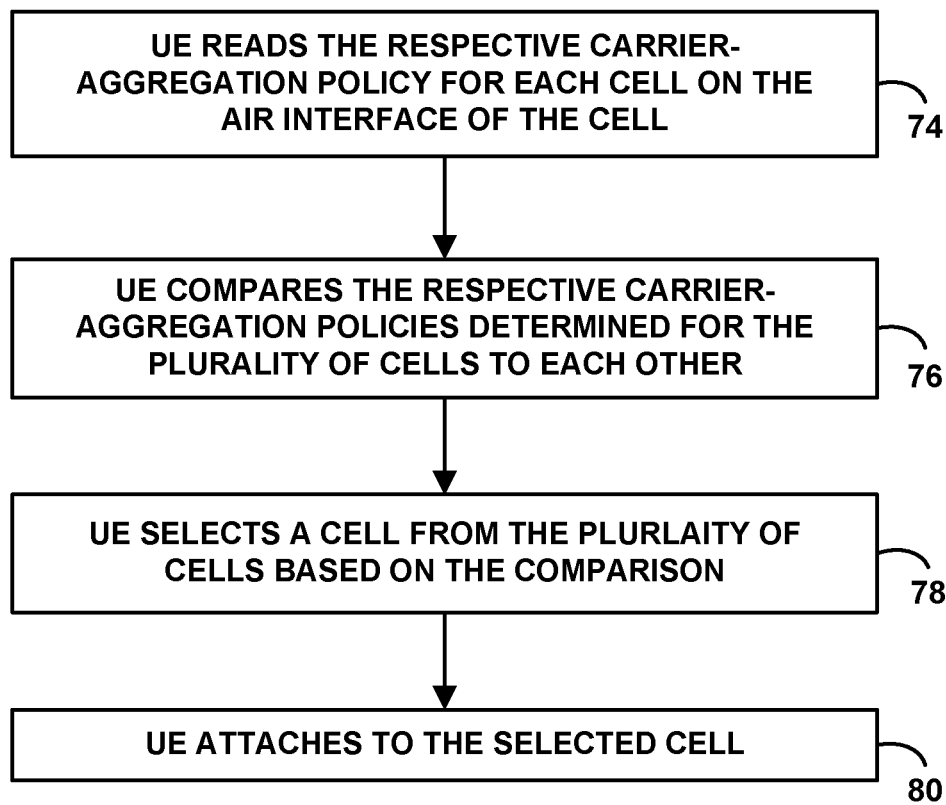
FIG. 9 is another flow chart depicting functions that can be carried out in accordance with the present disclosure.

FIG. 9 is next a flow chart depicting an example set of operations that can be carried out in an implementation of the process according to some aspects of the disclosure. In the illustrated example, the process is operable in a radio access network that includes a plurality of cells each having a respective carrier-aggregation policy. Each cell transmits a plurality of signals over a respective air interface. As shown in FIG. 9, at block 74, a UE reads the respective carrier-aggregation policy for each cell on the air interface of the cell to determine the carrier-aggregation policy of the cell. At block 76, the UE compares the respective carrier-aggregation policies determined for the plurality of cells to each other. At block 78, the UE selects a cell from the plurality of cells based on the comparison. Responsive to the selection at block 78, the UE attaches to the selected cell at block 80.

Figure 10:
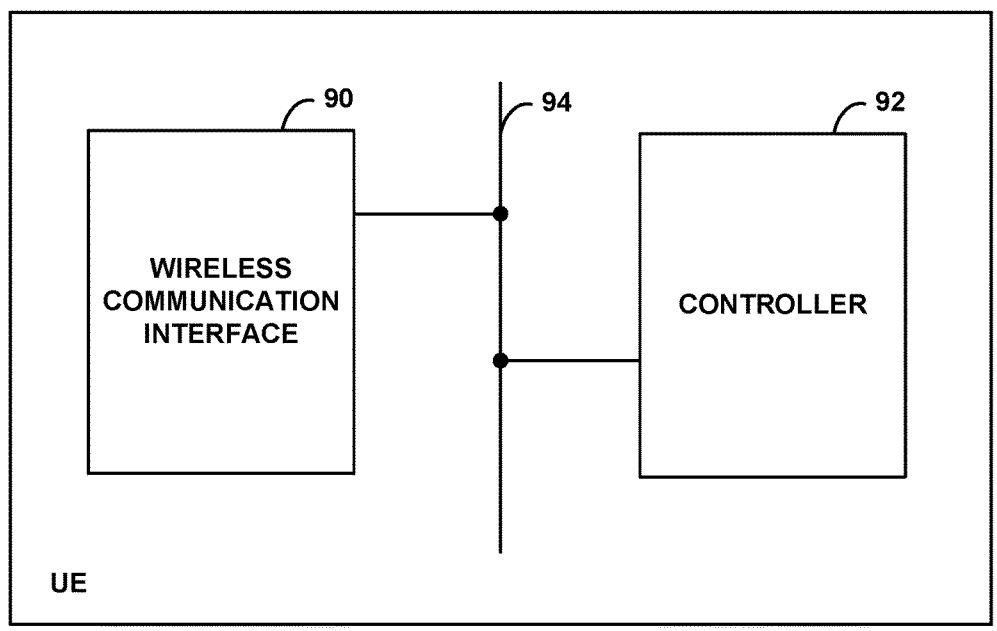
FIG. 10 is a block diagram of an example UE, in accordance with exemplary embodiments.

FIG. 10 is a simplified block diagram of an example UE, showing some of the components of such a UE to facilitate operation in accordance with the present disclosure, with the understanding that numerous variations are possible. As shown in FIG. 10, the example UE includes a wireless communication interface 90 and a controller 92, communicatively linked together by a system bus, network, or other connection mechanism 94 or perhaps integrated to some extent.

Wireless communication interface 90 may include a power amplifier, cellular transceiver, and antenna structure (not shown) and may function to engage in communication with a base station over an air interface as described above. Controller 92, which may comprise one or more processing units programmed with instructions to carry out various functions, may then process communications that the wireless communication interface receives from the base station.

In line with the discussion above, the controller can receive, via the wireless communication interface 90, a synchronization signal from a cell over an air interface of the cell. The controller can then determine the location on the air interface of the received synchronization signal. Based on the determined location of the synchronization signal, the controller can determine a location on the air interface of a carrier-aggregation policy signal for the cell. The carrier-aggregation policy signal indicates the carrier-aggregation policy of the cell. The controller can then read the carrier-aggregation policy signal at the determined location on the air interface to determine the carrier-aggregation policy of the cell. The controller can decide, based on the determined carrier-aggregation policy, to attach the UE to the cell and the controller can cause the UE to attach the cell.

Exemplary embodiments have been described above. Those skilled in the art will understand, however, that changes and modifications may be made to these embodiments without departing from the true scope and spirit of the invention.

What is claimed is:

1. A method operable in a radio access network comprising one or more base stations, wherein each of the one or more base stations provides one or more cells each operating on a respective carrier, wherein each of the one or more cells has a respective carrier aggregation (CA) policy, and transmits a plurality of signals over a respective air interface, wherein each of the plurality of signals is transmitted at a different location on the respective air interface, wherein each location on the respective air interface defines one or more resource elements, wherein each of the one or more resource elements is defined by at least one of time or frequency, the method comprising:

receiving, by a user equipment device (UE), a synchronization signal from one cell of the one or more cells over the respective air interface of the cell;

determining a first location of the synchronization signal on the respective air interface;

based on the determined first location on the respective air interface, determining a second location of a CA policy signal on the respective air interface for the cell, wherein the CA policy signal indicates the CA policy of the cell;

reading the CA policy signal at the determined second location on the respective air interface to determine the CA policy of the cell;

deciding, based on the determined CA policy signal, to attach the UE to the cell; and attaching the UE to the cell.

2. The method of claim 1, further comprising:
receiving, by the UE, a reference signal from the cell; and
determining, based on the received reference signal, a signal strength of the cell,
wherein deciding to attach the UE to the cell comprises deciding to attach the UE to the cell based on (i) the determined CA policy of the cell and (ii) the determined signal strength of the cell.

3. The method of claim 2, wherein the UE determines CA policy of the cell before the UE determines the signal strength of the cell.

4. The method of claim 1, wherein the UE receives the synchronization signal and the CA policy signal during a same time period on the respective air interface.

5. The method of claim 4, wherein each of the one or more resource elements is defined by time and frequency according to an Orthogonal Frequency Division Multiple Access (OFDMA) protocol,
wherein the respective air interface defines, over time, a plurality of sub-frames and each sub-frame is divided over time into a sequence of symbol time periods,
wherein the respective air interface further defines, over frequency, a plurality of subcarrier frequencies, and
wherein the UE periodically receives the synchronization signal and the CA policy signal at different subcarrier frequencies in a same symbol time period of a same sub-frame.

6. The method of claim 1, wherein deciding to attach to the cell comprises:
comparing the determined CA policy of the cell to a CA capability of the UE; and
deciding, based on the comparison of the determined CA policy to the CA capability of the UE, to attach the UE to the cell.

7. The method of claim 6, wherein the CA capability of the UE comprises a number of carriers N that the UE is capable of aggregating, wherein N>1, and wherein comparing the determined CA policy of the cell to the CA capability of the UE comprises determining, based on the determined CA policy, whether the cell can be aggregated with at least N−1 carriers.

8. The method of claim 1, wherein the synchronization signal comprises one or more signals selected from the group consisting of a primary synchronization signal (PSS) and a secondary synchronization signal (SSS).

9. A method operable in a radio access network comprising a plurality of cells each having a respective carrier aggregation (CA) policy, wherein each cell transmits a plurality of signals over a respective air interface, the method comprising:

reading, by a user equipment device (UE), the respective CA policy for each cell in a location on the respective air interface of the cell to determine the CA policy of the cell, wherein the location on the respective air interface defines one or more resource elements, wherein each of the one or more resource elements is defined by at least one of time or frequency;

comparing the respective CA policies determined for the plurality of cells to each other;

selecting a cell from the plurality of cells based on the comparison; and responsive to selecting the cell, the UE attaching to the selected cell.

10. The method of claim 9, wherein each of the plurality of signals is transmitted at a different location on the respective air interface, and
wherein reading the respective CA policy for each of the one or more cells on the respective air interface of the cell comprises:
(i) receiving a synchronization signal from the cell over the respective air interface of the cell,
(ii) determining a first location of the synchronization signal on the respective air interface,
(iii) based on the determined first location of the synchronization signal, determining a second location of a CA policy signal on the respective air interface for the cell, wherein the CA policy signal indicates the respective CA policy for the cell, and
(iv) reading the CA policy signal at the determined second location on the respective air interface to determine the CA policy of the cell.

11. The method of claim 9, wherein the plurality of cells comprises a first cell and a second cell,
wherein the first cell has a first CA policy that indicates a first extent to which the first cell is capable of CA and the second cell has a second CA policy that indicates a second extent to which the second cell is capable of CA,
wherein comparing the respective CA policies comprises determining that the first extent is greater than the second extent, and
wherein selecting the cell comprises selecting the first cell over the second cell based on the determination that the first extent is greater than the second extent.

12. The method of claim 11, wherein the first extent comprises a first number of cells that can be aggregated using the first cell as a primary cell (PCell) to serve the UE, wherein the second extent comprises a second number of cells that can be aggregated using the second cell as the PCell to serve the UE, and wherein the first number of cells is greater than the second number of cells.

13. The method of claim 11, wherein the first extent comprises a first amount of bandwidth that can be aggregated using the first cell as a primary cell (PCell) to serve the UE, wherein the second extent comprises a second amount of bandwidth that can be aggregated using the second cell as the PCell to serve the UE, and wherein the first amount of bandwidth is greater than the second amount of bandwidth.

14. The method of claim 11, further comprising comparing the respective CA policy determined for each of the plurality of cells to a CA capability of the UE, wherein the plurality of cells further comprises a third cell,
  wherein the third cell has a third CA policy that indicates a third extent to which the third cell is capable of CA, wherein the third extent is greater than the first extent,
  wherein comparing the respective CA policy determined for each of the plurality of cells to the CA capability of the UE comprises determining that the third extent is greater than an extent to which the UE is capable of CA and the first extent is less than or equal to the extent to which the UE is capable of CA,
  wherein selecting the cell comprises selecting the first cell over the third cell based on the determination that the third extent is greater than the extent to which the UE is capable of CA and the determination that the first extent is less than or equal to the extent to which the UE is capable of CA.

15. The method of claim 9, further comprising:
receiving a reference signal respectively from each cell; and
determining a signal strength of each cell based on the respective reference signal received from the cell,
  wherein selecting the cell from the plurality of cells comprises selecting the cell from the plurality of cells based on (i) the comparison of the respectively determined CA policies and (ii) the signal strength respectively determined for each cell.

16. The method of claim 9, further comprising:
for each cell:
  (v) comparing the respective CA policy determined for each of the plurality of cells to a CA capability of the UE;
  (vi) deciding, based on the comparison of the respective CA policy determined for the cell to the capability of the UE, whether to determine a signal strength of a reference signal transmitted by the cell;
  (vii) if the decision is to determine the signal strength, determining a signal strength of the reference signal transmitted by the cell; and
  (viii) if the decision is to not determine the signal strength, disregarding the cell during the selecting the cell from the plurality of cells,
  wherein selecting the cell comprises selecting the cell from the plurality of cells based on the determined signal strength of the reference signal transmitted by the cell.

17. A user equipment device (UE), comprising:
a wireless communication interface for engaging in communication with one or more cells each over a respective air interface, wherein the respective air interface of each of the one or more cells comprises a plurality of locations for carrying signals transmitted by the cell, wherein each location on the respective air interface defines one or more resource elements, wherein each of the one or more resource elements is defined by at least one of time or frequency, and
a controller for processing communications that the wireless communication interface receives from the one or more cells, wherein the controller is configured to:
  (i) receive, via the wireless communication interface, a synchronization signal from one cell of the one or more cells over the respective air interface of the cell;
  (ii) determine a first location of the synchronization signal on the respective air interface;
  (iii) based on the determined first location of the synchronization signal, determine a second location of a carrier aggregation (CA) policy signal on the respective air interface for the cell, wherein the CA policy signal indicates a CA policy of the cell;
  (iv) read the CA policy signal at the determined second location on the respective air interface to determine the CA policy of the cell;
  (v) decide, based on the determined CA policy, to attach the UE to the cell; and
  (vi) cause the UE to attach the cell.

18. The UE of claim 17, wherein the controller is configured to:
  (vii) receive a reference signal from the cell; and
  (viii) determine, based on the reference signal, a signal strength of the cell,
  wherein the controller is configured to decide to attach the UE to the cell based on (i) the determined CA policy of the cell and (ii) the determined signal strength of the cell.

19. The UE of claim 18, wherein the controller is configured to determine the CA policy of the cell before the UE determines the signal strength of the cell.

20. The UE of claim 17, wherein, to decide to attach to the cell, the controller is configured to:
compare the determined CA policy of the cell to a CA capability of the UE; and
decide, based on the comparison of the determined CA policy to the CA capability of the UE, to attach the UE to the cell.

* * * * *